UNITED STATES PATENT OFFICE.

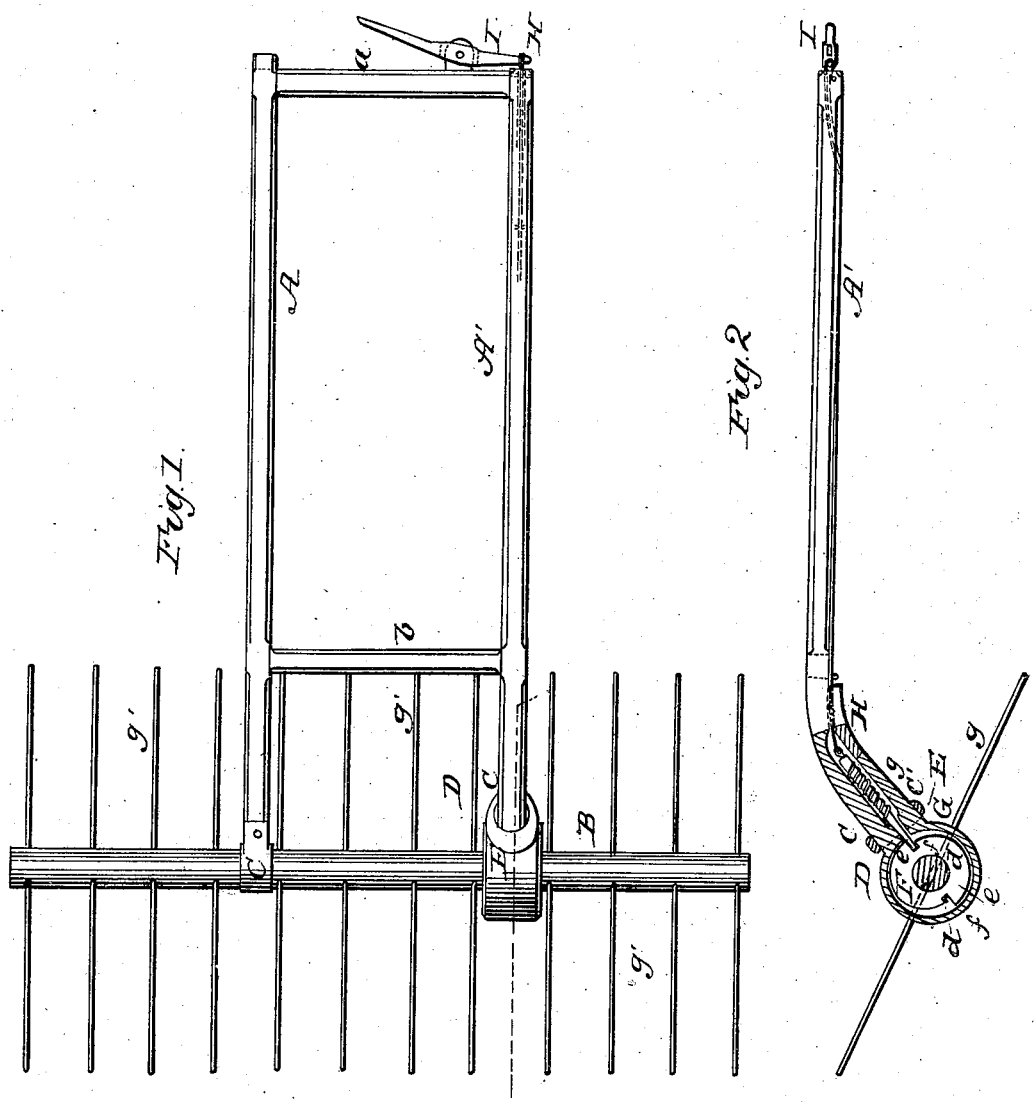

EZRA CALDERWOOD, OF PORTLAND, MAINE.

IMPROVEMENT IN REVOLVING HAY-RAKES.

Specification forming part of Letters Patent No. 46,447, dated February 21, 1865.

*To all whom it may concern:*

Be it known that I, EZRA CALDERWOOD, of Portland, in the county of Cumberland and State of Maine, have invented a new and Improved Revolving Hand and Horse Rake; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a side sectional view of the same taken in the line $x\ x$, Fig. 1.

Similar letters of reference indicate like parts.

This invention relates to a new and improved revolving rake to be drawn either manually or by a horse; and it consists in a novel and simple means employed for holding the rake in working position, and which will admit of being readily actuated to liberate the rake, so that it may revolve and discharge its load when necessary.

A A' represent two thills, connected at their outer ends by a cross-bar, $a$, and connected near their inner ends by a cross-bar, $b$, as shown clearly in Fig. 1. One of these thills, A, is connected to the rake-head B by a metal strap or eye, C, the former being allowed to turn freely in the latter. The other thill, A', has a box, D, attached to its inner end, said box being constructed of two parts, $c\ c'$, one of which, $c$, is permanently attached to the thill, and the other, $c'$, secured to $c$ by a sliding collar or band, E. By this means the part $c'$ may be readily attached to and detached from $c$. This box D is composed of a cylindrical part and a shank, the parts $c\ c'$ being longitudinal halves of the same, and the collar or band E fitted on the shank. (See Fig. 2.)

On the rake-head B there is permanently secured or keyed a wheel, F, which is fitted within the box D, the latter forming a bearing for the rake-head, like the strap or eye C of the thill A. This wheel F has its periphery at two opposite sides provided with recesses $d\ d$, which form eccentric surfaces and leave a shoulder, $e$, at each end of the same, as shown in Fig. 2. These recesses adjoining the shoulders $e$ are notched, as shown at $f$, said notches extending radially into the wheel, as also shown in Fig. 2.

Within the shank of the box D there is placed a slide, G, which has a spiral spring, $g$, around it, and this spring has a tendency to keep the outer end of the slide G pressed toward or against the periphery of the wheel F. The inner end of the slide G has a rod, H, attached to it, which rod passes through the thill A', extending its whole length, and is connected at its outer end to a lever, I, on the front cross-bar, $a$, of the thills. (See Fig. 1.)

From the above description it will be seen that the rake will, as it is drawn along, be held in proper position to perform its work in consequence of the slide G being in one of the notches $f$ of the wheel F, the shoulder $e$ forming a good bearing-surface on the slide; and it will further be seen that when the rake has gathered up a sufficient load the latter may be readily discharged by simply actuating the lever I, so as to draw the slide G outward and free from the wheel F, the rake then making a half-revolution in consequence of the front ends of the teeth $g'$ catching against the ground, the rake being retained or held when it completes a half-revolution in consequence of the shoulder $e$, which previously was at the rear side of the rake-head, coming in contact with the slide G and the latter entering the notch $f$ adjoining said shoulder. Thus by this simple arrangement, which may be manipulated with the greatest facility, the rake may at the will of the driver or operator be made to revolve or make a half-revolution in order to discharge its load, and at the same time be held securely in proper position while performing its work.

While disclaiming the use of the notched or recessed wheel and spring-bolt with a revolving rake, I claim as new and desire to secure by Letters Patent—

The combination, with the thill A', of the box D, movable cap $c'$, and spring-bolt G, the latter engaging with the notched or recessed wheel E upon the rake-head, all as herein described.

EZRA CALDERWOOD.

Witnesses:
S. L. CARLETON,
JOHN S. KIMBALL.